(12) United States Patent
Lacerda, Jr.

(10) Patent No.: US 7,243,999 B2
(45) Date of Patent: Jul. 17, 2007

(54) INTEGRATED TRUCK BODY BACKPACK

(76) Inventor: Henry A. Lacerda, Jr., 465 Oliphant La., Middletown, RI (US) 02842

( * ) Notice: Subject to any disclaimer, the term of this patent is extended or adjusted under 35 U.S.C. 154(b) by 0 days.

(21) Appl. No.: 11/165,787

(22) Filed: Jun. 25, 2005

(65) Prior Publication Data

US 2006/0290196 A1 Dec. 28, 2006

(51) Int. Cl.
*B60P 1/04* (2006.01)
(52) U.S. Cl. .................................................. 298/17 R
(58) Field of Classification Search .............. 298/17 R; 296/183.2
See application file for complete search history.

(56) References Cited

U.S. PATENT DOCUMENTS

| | | | | |
|---|---|---|---|---|
| 1,704,884 A | * | 3/1929 | Cullinan | .................... 298/17 R |
| 2,402,393 A | * | 6/1946 | Griffith | ...................... 254/29 R |
| 4,840,531 A | * | 6/1989 | Dinneen | ...................... 414/409 |
| 5,226,757 A | * | 7/1993 | Tarrant | ......................... 406/39 |
| 5,829,842 A | * | 11/1998 | Lombardo | ................. 298/23 R |
| 6,210,094 B1 | * | 4/2001 | McNeilus et al. | ........... 414/409 |
| 6,213,706 B1 | * | 4/2001 | Christenson | ................. 414/408 |
| 6,302,636 B1 | * | 10/2001 | Duron | ........................ 414/409 |
| 6,390,758 B1 | * | 5/2002 | McNeilus et al. | ........... 414/408 |
| 6,523,905 B2 | * | 2/2003 | Tamura et al. | ............. 298/22 R |
| 6,916,142 B2 | * | 7/2005 | Hansen et al. | ................. 410/77 |

* cited by examiner

*Primary Examiner*—H Gutman

(57) ABSTRACT

An integrated dump body storage compartment is provided. The integrated dump body storage compartment includes a dump body and a framed assembly. The framed assembly further includes at least one access opening and has its longitudinal axis mounted transverse to the longitudinal axis of the dump body. The framed assembly defines a storage area therewithin.

10 Claims, 6 Drawing Sheets

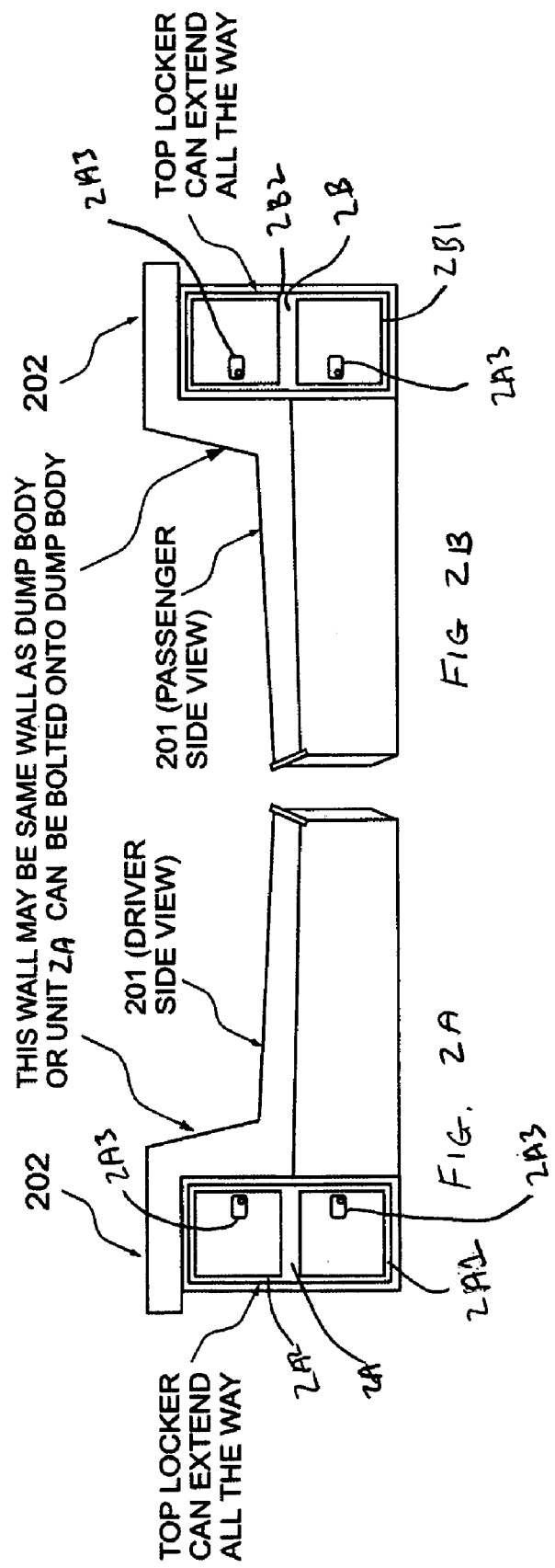

INTEGRATED TRUCK BODY BACKPACK

BACKGROUND OF THE INVENTION

1. Field of the Invention

The present invention relates generally to truck bodies and specifically to a versatile truck body with integrally formed storage compartments.

2. Prior Art

Short wheel base and other wheel base trucks, in particular full-size pick-up trucks, dual wheel trucks and super duty trucks, are increasingly used for such various purposes as snow removal, towing livestock trailers, and hauling landscaping equipment and debris because the short wheel base allows easier maneuverability than a larger wheel base truck. Businesses that are seasonal in nature, such as landscaping and snow removal, are often conducted by a single entity and must use the same trucks for these different activities.

Currently, various storage containers, often referred to as back packs are already available for mounting on the platform of an open truck 10 to serve as tool boxes and the like. One such prior art container 103 is designed to extend across the entire width of the truck platform and has a roof-shaped top with a ridge extending longitudinally of the truck platform, along the centre of the truck, and a pair of pivotal lids or covers sloping downwardly from the ridge towards opposite sides of the truck and being hinged at or adjacent the ridge to provide access to the interior of the container over the side walls of the truck. Typically these after market storage containers are two feet wide and are located between the truck cab and the truck dump body, as shown in FIG. 1, item 103, FIG. 1A, item 103, and alternate prior art configuration, item 103B shown in FIG. 1B.

However, it will be appreciated that the dump body must disadvantageously be relocated such that the dump body extends at least two feet beyond the truck body platform to account for the added storage container and clearance gaps 104,105. The truck body platform must also be extended several more inches for the dump body to clear the storage container when the dump body 101 is raised to its dumping position.

It will also be appreciated that another disadvantage is short wheel base trucks lose some maneuverability due to the relocated dump body extending beyond the truck body platform. This extra extension makes it difficult for short wheel base trucks to maneuver in tight spaces, such as when snow plowing.

The prior art, therefore, has failed to provide a versatile, multipurpose truck body with dumping capability for trucks with wheel bases of different lengths that includes storage capacity formed integrally with the truck body for enhanced cargo volume in conjunction with a flexible arrangement of removable and fixed side wall panels and rear doors that allow maximum rear and side visibility for flexible access to the truck body interior and permit compatibility of the truck body with a goose-neck type of trailer hitch. A need exists for such a truck body.

SUMMARY OF THE INVENTION

The foregoing and other problems are overcome, and other advantages are realized, in accordance with the presently preferred embodiments of these teachings.

In accordance with one embodiment of the present invention an integrated dump body storage compartment is provided. The integrated dump body storage compartment includes a dump body and a framed assembly. The framed assembly further includes at least one access opening and has its longitudinal axis mounted transverse to the longitudinal axis of the dump body. The framed assembly defines a storage area therewithin.

In accordance with another embodiment of the present invention a dump truck having an integrated dump body storage compartment is provided. The integrated dump body storage compartment includes a dump body and at least one assembly, wherein the at least assembly has its longitudinal axis mounted transverse to the longitudinal axis of the dump body. The assembly defines at least one storage area therewithin.

The invention is also directed towards an integrated dump body storage compartment, the integrated dump body storage compartment including a dump body, wherein the dump body further includes a rectangular shaped integrated storage area.

BRIEF DESCRIPTION OF THE DRAWINGS

The foregoing aspects and other features of the present invention are explained in the following description, taken in connection with the accompanying drawings, wherein:

FIG. 2A is a driver side pictorial illustration of the integrated backpack/dump body feature of the present invention;

FIG. 2B is a passenger side pictorial illustration of the integrated backpack/dump body feature of the present invention;

DETAILED DESCRIPTION OF THE PREFERRED EMBODIMENT

Figure 1:
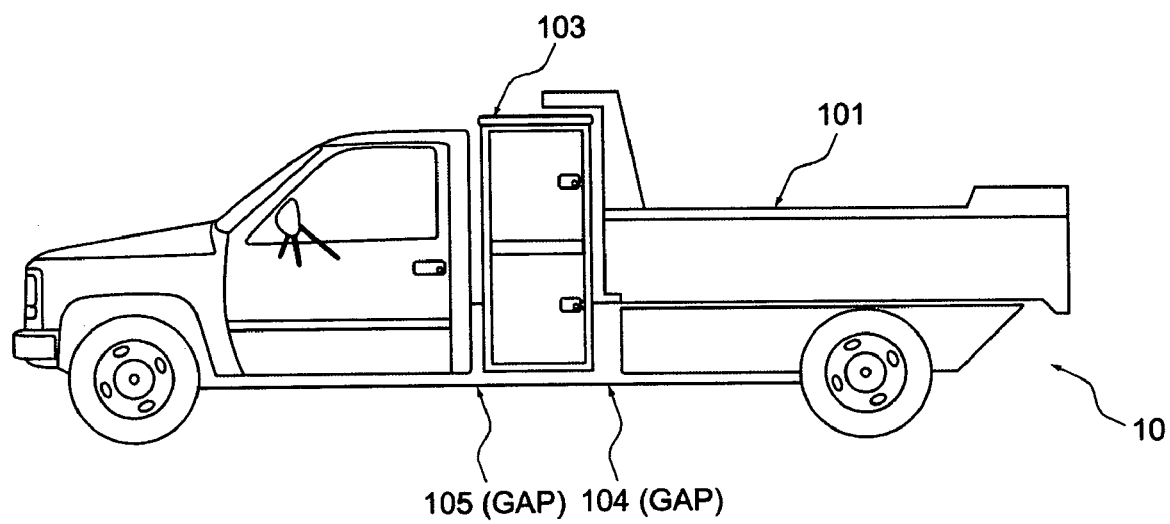
FIG. 1 is a pictorial illustration of a prior art dump truck backpack.
Figure 1A:
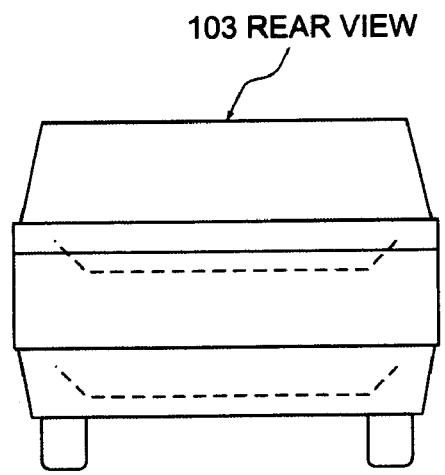
FIG. 1A is a pictorial illustration of a rear view of the backpack shown in FIG. 1.
Figure 1B:
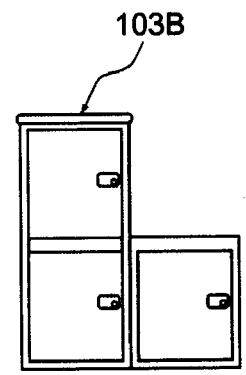
FIG. 1b is a pictorial illustration of an alternate dump truck backpack configuration.

Referring to FIG. 2A, there is shown a driver side pictorial illustration of an integrated dump body/backpack features of the present invention. Although the present invention will be described with reference to the embodiments shown in the drawings, it should be understood that the present invention might be embodied in many alternate forms of embodiments.

Reference is first made to FIGS. 2A and 2B for illustrating the integrated backpack/dump body feature 202 of the present invention. It will be seen that the dump body 201 is integrated with the storage compartment 2A1. It will be further appreciated that the storage compartment 2A may be dual compartments 2A1, 2A2, as shown in FIG. 2A or a single compartment not shown. It will be appreciated that storage compartment 2B is the passenger side view of storage compartment 2A as shown in FIG. 2B. Storage compartment 2A is integrated with dump body 201 by any suitable fastening method such as bolting or welding. It will also be appreciated that storage compartment 2A and dump body 201 may share a common wall.

Storage compartment 2A may be formed from any suitable light weight material such as aluminum or lightweight steel or a suitable combination. Storage compartment 2A1 is generally boxed shaped with internal compartments sized to hold landscaping equipment. The internal compartments may be any suitable size and contain suitable shelving features. FIGS. 2A and 2B illustrate the top storage compartment 2A2 and 2B2 extending the width of the dump body 202.

Still referring to FIG. 2A it can be seen that the integrated dump body 202 extends beyond the storage compartment 2A1 to form a cab protector.

Still referring to FIGS. 2A and 2B, the storage compartments 2A1, 2A2, 2B1, and 2B2 include a latching mechanism 2A3 to secure the storage compartment doors. It will be appreciated that in alternate embodiments that the storage compartment doors may be any suitable material.

Figure 3:
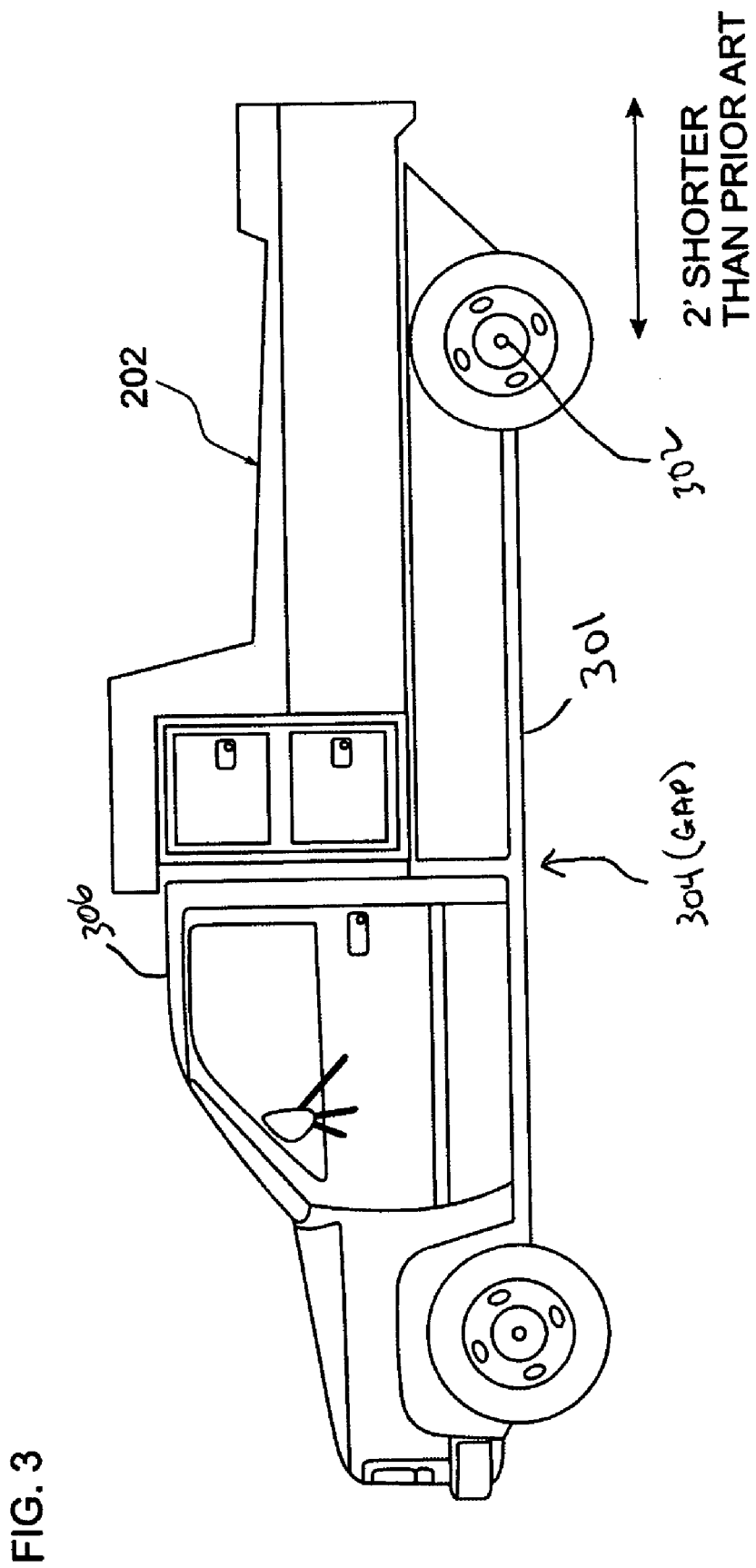
FIG. 3 is a pictorial illustration of the integrated backpack/dump body feature shown in FIGS. 2A and 2B integrated with a dump truck.

Referring to FIG. 3 there is shown a pictorial illustration of the integrated backpack/dump body feature 202 shown in FIGS. 2A and 2B integrated with a dump truck 301. It will be appreciated that the present invention allows the short wheel base dump truck to use the same size dump body (See FIG. 1, 101) for hauling the same capacity cargo but that the integrated backpack/dump body 202 is approximately two feet shorter from the rear axle 302 to the rear of the integrated backpack/dump body 202. It will be further appreciated that the integrated backpack/dump body feature of the present invention two foot reduction advantageously allows for greater maneuverability with a short wheel base dump truck than a standard backpack installed as shown in FIG. 1 (prior art).

Figure 3A:
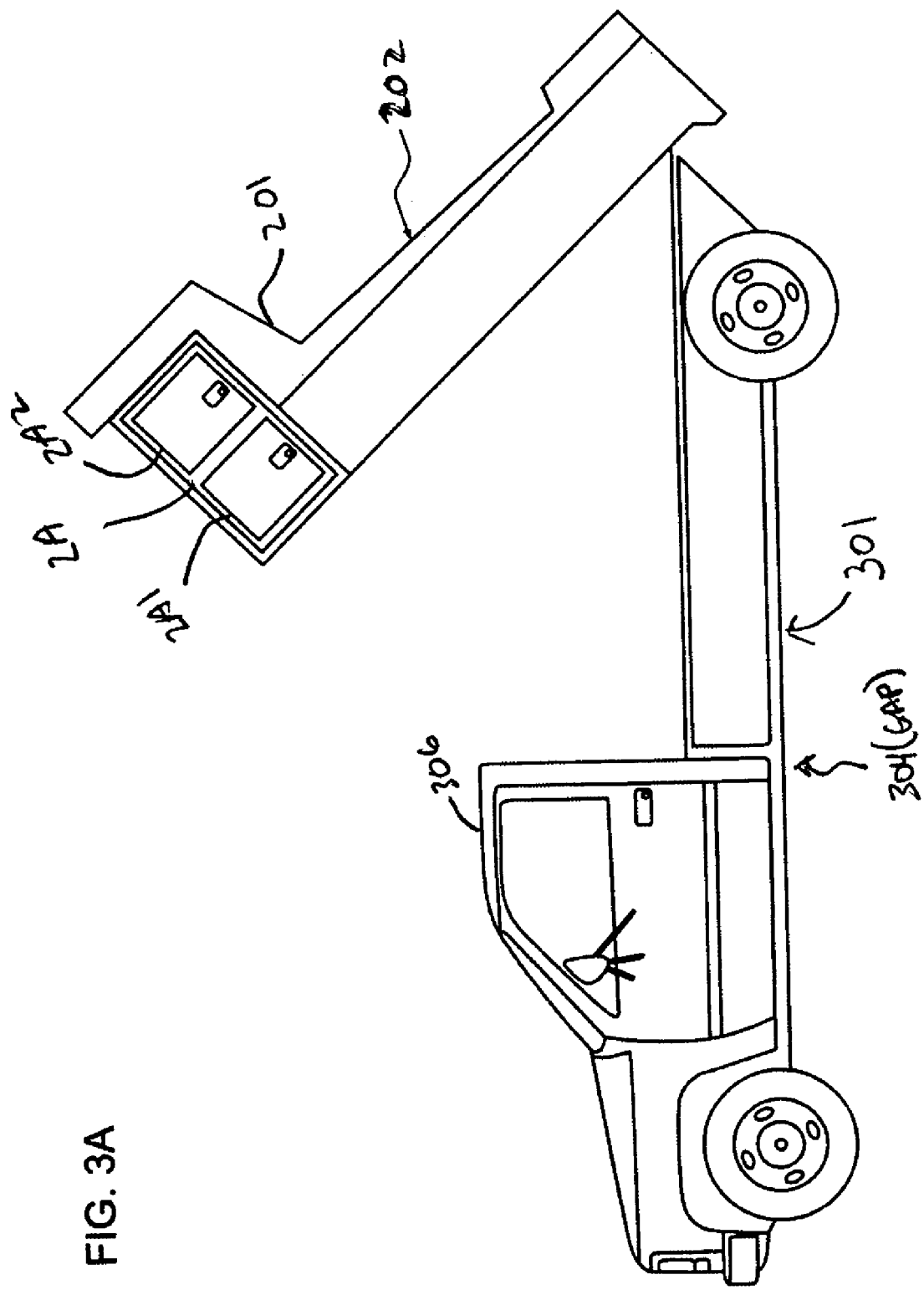
FIG. 3A is a pictorial illustration of the integrated backpack/dump body feature shown in FIGS. 2A and 2B integrated with a dump truck and shown in a lift position.

Referring to FIG. 3A there is shown a pictorial illustration of the integrated backpack/dump body feature shown in FIGS. 2A and 2B integrated with a dump truck and shown in a lift position. It will be appreciated that storage compartment 2A integrated with dump body 201 to form the integrated backpack/dump body 202 feature of the present invention may be any suitable width such that a suitable gap 304 between cab 306 and the integrated backpack/dump body 202 is maintained when the integrated backpack/dump body 202 is raised or lowered.

Figure 4:
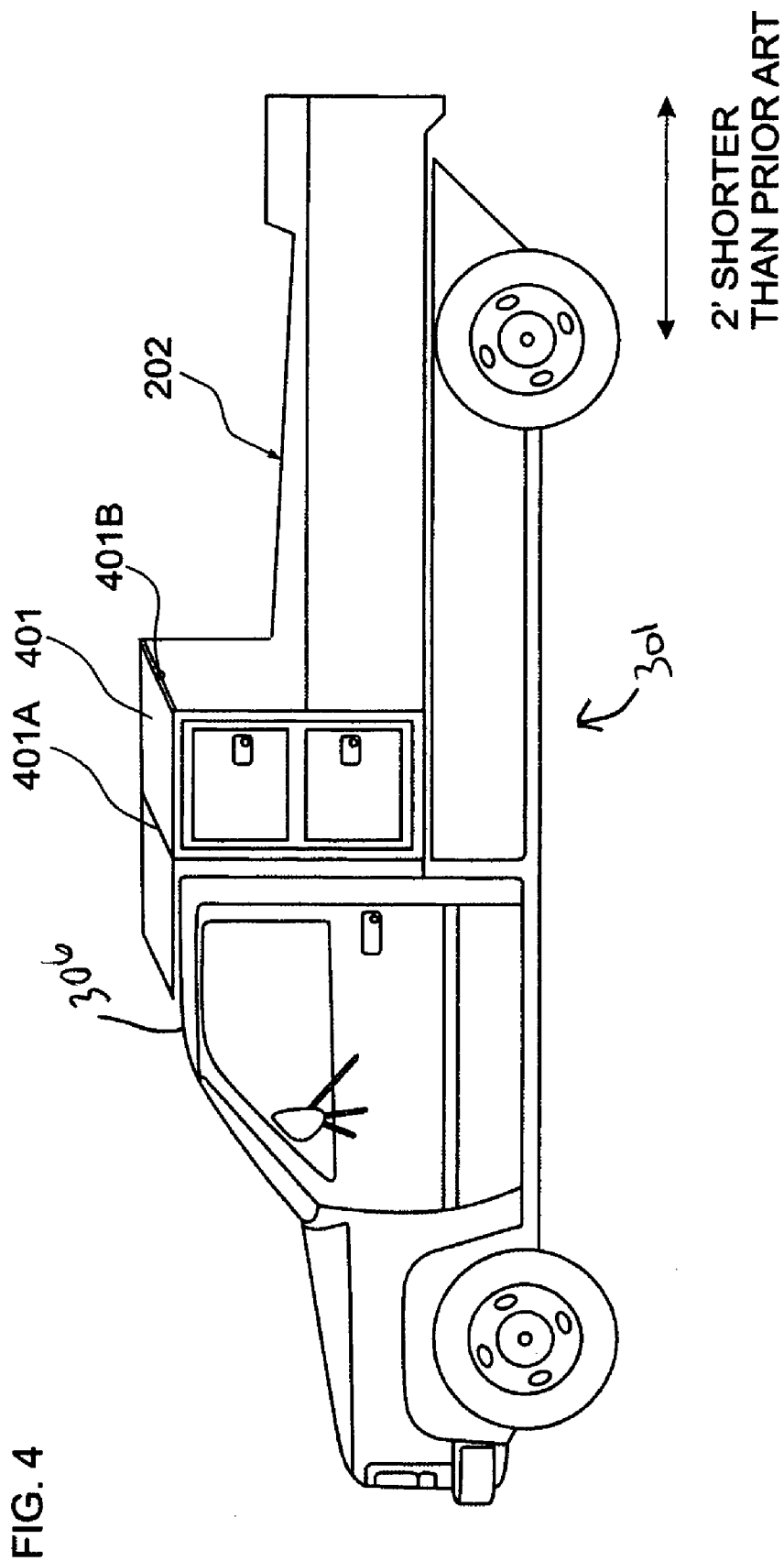
FIG. 4 is a pictorial illustration of an alternate embodiment of the integrated backpack/dump body feature of the present invention shown in FIGS. 2A and 2B with an integrated cab protection feature.

Referring to FIG. 4 there is shown a pictorial illustration of an alternate embodiment of the integrated backpack/dump body feature of the present invention shown in FIGS. 2A and 2B with an integrated cab protection feature 401A.

Figure 4A:
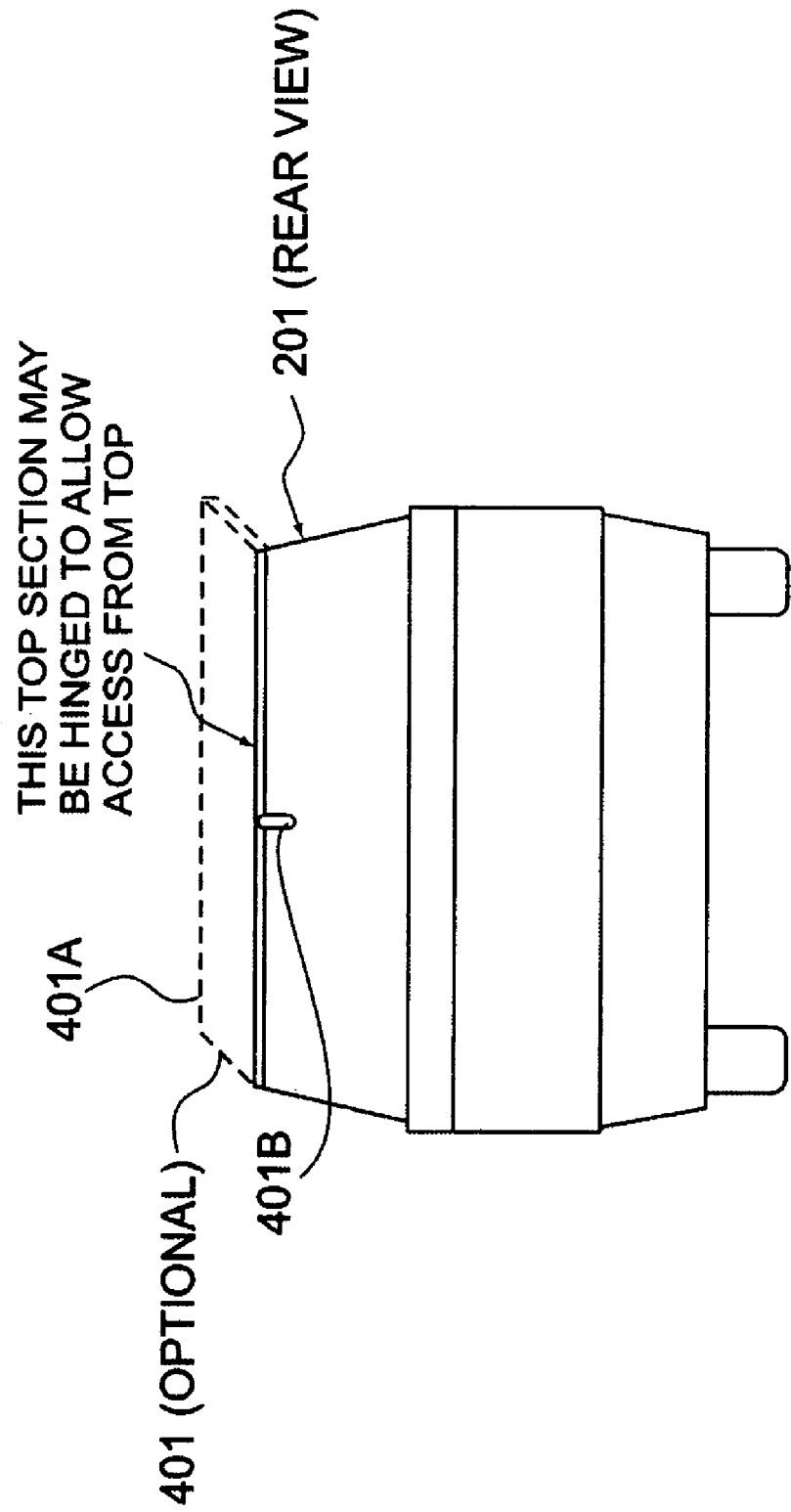
FIG. 4A is a rear view illustration of the present invention shown in FIGS. 2A and 2B showing an optional rear storage access.

It should be understood that the foregoing description is only illustrative of the invention. Thus, various alternatives and modifications can be devised by those skilled in the art without departing from the invention. For example, referring to FIG. 4A there is shown a rear view illustration of the present invention shown in FIGS. 2A and 2B showing an optional rear storage access via hinged panel 401 with latching mechanism 401B.

What is claimed is:

1. An integrated dump body storage compartment, the integrated dump body storage compartment comprising:
   a dump body; and
   at least one framed assembly, the at least one framed assembly comprising:
      at least one access opening, and wherein the at least one framed assembly having its longitudinal axis mounted transverse to the longitudinal axis of the dump body, the at least one framed assembly defining a storage area therewithin; and
      at least two storage compartments.

2. An integrated dump body dump body storage compartment, the integrated dump body storage compartment comprising:
   a dump body; and
   at least one framed assembly, the at least one framed assembly comprising:
      at least one access opening, and wherein the at least one framed assembly having its longitudinal axis mounted transverse to the longitudinal axis of the dump body, the at least one framed assembly defining a storage area therewithin;
   an upper storage area defined by an upper portion of the at least one framed assembly; and
   a lower storage area defined by a lower portion of said frame assembly.

3. An integrated dump body storage compartment as in claim 2 wherein the at least one framed assembly having its longitudinal axis mounted transverse to the longitudinal axis of the dump body further comprises the at least one framed assembly bolted to the dump body.

4. An integrated dump body storage compartment as in claim 2 wherein the at least one framed assembly having its longitudinal axis mounted transverse to the longitudinal axis of the dump body further comprises the at least one framed assembly welded to the dump body.

5. An integrated dump body storage compartment as in claim 2 wherein the at least one framed assembly having its longitudinal axis mounted transverse to the longitudinal axis of the dump body further comprises the at least one framed assembly having at least one common side with the dump body.

6. An integrated dump body storage compartment as in claim 2 wherein the at least one framed assembly comprises lightweight aluminum.

7. An integrated dump body storage compartment as in claim 2 wherein the at least one framed assembly comprises lightweight steel.

8. An integrated dump body storage compartment, the integrated dump body storage compartment comprising:
   a dump body, wherein the dump body further comprises a rectangular shaped integrated storage area, wherein the rectangular shaped integrated storage area further comprises an integrated cab protector.

9. An integrated dump body storage compartment as in claim 8 wherein a longitudinal axis of the rectangular shaped integrated storage area lies transverse to a longitudinal axis of the dump body.

10. An integrated dump body storage compartment the integrated dump body storage compartment comprising:
   a dump body, wherein the dump body further comprises a rectangular shaped integrated storage area wherein the rectangular shaped integrated storage area further comprises at least one adjustable shelf.

* * * * *